United States Patent [19]

Inoue et al.

[11] Patent Number: 4,592,960

[45] Date of Patent: Jun. 3, 1986

[54] PRODUCTION OF POLYOLEFIN COPOLYMER

[75] Inventors: Hiroshi Inoue; Tadashi Sezume, both of Saitama; Kazuo Sei, Kanagawa, all of Japan

[73] Assignee: Toa Nenryo Kogyo Kabushiki Kaisha, Tokyo, Japan

[21] Appl. No.: 723,998

[22] Filed: Apr. 17, 1985

Related U.S. Application Data

[63] Continuation of Ser. No. 490,810, May 2, 1983, abandoned.

[30] Foreign Application Priority Data

May 17, 1982 [JP] Japan .................................. 57-81473

[51] Int. Cl.$^4$ ...................... B32B 27/00; B32B 27/08; B32B 15/08
[52] U.S. Cl. .................... 428/461; 428/355; 428/483; 428/516; 428/517; 428/518; 525/66; 525/71; 525/74; 525/78
[58] Field of Search ............... 428/483, 516, 461, 517, 428/518; 525/66, 71, 74, 78

[56] References Cited

U.S. PATENT DOCUMENTS

| | | | |
|---|---|---|---|
| 3,375,300 | 3/1968 | Ropp | 525/66 |
| 3,447,460 | 6/1969 | Vincent et al. | 428/461 |
| 3,493,632 | 2/1970 | Okazaki et al. | 525/425 |
| 3,496,249 | 2/1970 | Hitzler et al. | 525/66 |
| 4,017,557 | 4/1977 | Hammer et al. | 525/66 |
| 4,283,502 | 8/1981 | Richardson | 525/66 |
| 4,416,944 | 11/1983 | Adur | 428/355 |
| 4,472,555 | 9/1984 | Schmukler et al. | 525/78 |
| 4,532,187 | 7/1985 | Hoenig et al. | 428/461 |

FOREIGN PATENT DOCUMENTS 51-70254   5/1976   Japan .
52-34674  11/1976   Japan .
52-33941   3/1977   Japan .

*Primary Examiner*—Wilbert J. Briggs, Sr.
*Attorney, Agent, or Firm*—R. L. Graham

[57] ABSTRACT

A polyolefin product is produced by reacting a polyolefin grafted with a carboxylic acid or anhydride thereof with a polar polymer containing amino groups. The amino groups in the reaction products improves adhesion and compatibility properties.

22 Claims, No Drawings

PRODUCTION OF POLYOLEFIN COPOLYMER

This is a continuation of application Ser. No. 490,810, filed May 2, 1983, now abandoned.

BACKGROUND OF THE INVENTION

The present invention relates to modified polyolefin copolymers and process for its production. The modified polyolefin is prepared by reacting a polyolefin grafted with an unsaturated carboxylic acid or an anhydride thereof with a polar polymer having amino groups.

Heretofore, the improvement of polyolefin in adhesion to metals, glass fiber, and polymers have been accomplished by grafting a polyolefin with a compound having polar groups, e.g., an unsaturated carboxylic acid such as maleic anhydride and acrylic acid, or by reacting further the resulting modified polyolefin with monomer or oligomer of amines, alcohols, or epoxy compounds.

However, modified polyolefins thus produced are improved to some extent in adhesion properties and hot tack properties. But they still have some disadvantages. Namely, the compound having functional groups introduced into the modified polyolefin is short in chain length and small in molecular weight (weight-average molecular weight hereinafter); therefore, they do not improve the compatibility of polyolefins with a polar polymer which is blended with polyolefin to improve polyolefin's adhesion properties, paintability, and printability.

SUMMARY OF THE INVENTION

It has been discovered that by reacting a high molecular weight polar polymer having effective number of functional groups with a modified polyolefin, a copolymer (or interpolymer) of improved properties in adhesion and compatibility is obtained.

The improved copolymer is obtained by a process which comprises reacting a modified polyolefin prepared by reacting a polyolefin with an unsaturated carboxylic acid or an anhydride thereof, with a high molecular weight polar polymer having reactive amino groups.

DESCRIPTION OF THE PREFERRED EMBODIMENTS

This modified polyolefin which is one of the raw materials for the polyolefin copolymer of this invention is prepared by grafting a polyolefin with an unsaturated carboxylic acid or anhydride thereof. The polyolefin for this purpose includes, for example, low-density polyethylene, linear low-density polyethylene (a copolymer of ethylene and an alpha-olefin), medium and high-density polyethylene, polypropylene, poly-1-butene, poly-4-methyl-1-pentene, ethylene-propylene copolymer, ethylene-1-butene copolymer, propylene-1-butene copolymer, ethylene-propylene copolymer rubber, ethylene-1-butene copolymer rubber, ethylene-propylene-diene terpolymer, and mixtures thereof. The unsaturated carboxylic acid or anhydride thereof which is used for graft reaction includes, for example, maleic acid, maleic anhydride, acrylic acid, methacrylic acid, citraconic acid, citraconic anhydride, itaconic acid, itaconic anhydride, and other $\alpha,\beta$-unsaturated carboxylic acid or anhydride thereof; and cis-4-cyclohexene-1,2-dicarboxylic acid, cis-4-cyclo-hexene-1,2-dicarboxylic anhydride, endobicyclo-[2,2,1]-5-heptene-2,3-dicarboxylic acid, endo-bi-cyclo-2[2,2,1]-5-heptene-2,3-dicarboxylic anhydride, and other alicyclic dicarboxylic acid or anhydride thereof having a cis double bond in the ring.

The graft reaction of a polyolefin with an unsaturated carboxylic acid or anhydride thereof can be performed in a variety of known methods. In one method, for example, the graft reaction is accomplished by heating the two reactants to a high temperature in the presence or absence of a solvent for the reactants, with or without a reaction initiator. According to an industrial method, a polyolefin is mixed previously with an unsaturated carboxylic acid or anhydride thereof and a reaction initiator, and the resulting mixture is melted and mixed using an extruder at a temperature higher than the melting point of polyolefin.

The modified polyolefin thus prepared should have a molecular weight from 5,000 to 1,000,000, preferably from 10,000 to 500,000, and have 1 to 50, preferably 1 to 10 on average, of the unsaturated carboxylic acid or anhydride thereof in the molecule and/or at the terminals of the molecule. If the molecular weight of the modified polyolefin is less than 5,000, the polyolefin copolymer to be obtained by the subsequent reaction is low in molecular weight and is poor in adhesion and performance when used as a compatibility improving agent for mixing of a polyolefin and polar polymer. On the other hand, if the molecular weight exceeds 1,000,000, the resulting copolymer is poor in moldability. If the number of the molecules of the unsaturated carboxylic acid or anhydride thereof grafted on to the polyolefin is less than one on average, the rate of reaction is low and much of the reactants remain unreacted. On the other hand, if it exceeds 50, the polymeric reaction takes place excessively, causing crosslinking and gelation. When using a polymer or copolymer of ethylene, the molecular weight of the modified polymer should preferably be between 10,000 and 150,000. When using a polymer or copolymer of propylene, the molecular weight of the modified polymer preferably is between 80,000 and 200,000.

The polar polymer containing amino groups which is one of the raw materials for the polyolefin copolymer of this invention includes, for example, polymers or copolymers prepared by vinyl polymerization of vinyl compounds with amino containing compounds. The vinyl compounds include vinyl halide, vinyl ester, vinyl ether, vinyl ketone, acrylic acid and its derivative, and styrene and its derivative. Such polymers and copolymers have amino groups in the molecule and/or at the terminals of the molecule.

Examples of such polymers and copolymers are those compounds which have amino groups in the molecule and work as a chain transfer agent for radical reaction, e.g., di-p-aminophenyldisulfide, 1-aminomethanethiol, 1-aminoethanethiol, 2-aminoethanethiol, 1-aminopropanethiol, 2-aminopropanethiol, 3-aminopropanethiol, 1-aminobutanethiol, 2-aminobutanethiol, 4-aminobutanethiol 1,1-dimethyl-2-aminoethanethiol, 1,1-dimethyl-1-aminoethanethiol, 3-aminocyclopentadiene-1-thiol, 1-aminobezenethiol, 2-aminobenzenethiol, 3-aminobenzenethiol, 1-aminomethylbenzenethiol, 2-aminomethylbenzenethiol, 3-aminomethylbenzenethiol, 1-aminoethylbenzenethiol, 2-aminoethylbenzenethiol and 3-aminoethylbenzenethiol; a copolymer of vinyl monomer having an amino group in the molecule such as p-aminostyrene, 2-aminoethyl(meth)acrylate and at least one kind of monomer selected from aromatic compounds such as styrene, methylstryene, α-methylstyrene, and vinyl styrene; acrylic acid and derivatives thereof such as (meth)acrylic acid, methyl(meth)acrylate, ethyl(meth)acrylate, propyl(meth)acrylate, isobutyl(meth)acrylate, n-butyl (meth)acrylate, hexyl methacrylate, 2-ethylhexyl acrylate, and (meth)acrylonitrile; vinyl halide such as vinyl chloride; and fatty acid vinyl ester such as vinyl acetate and vinyl propionate.

Preferable among the polar polymers containing amino groups are amino-terminated polystyrene and amino-terminated acrylic copolymers.

These amino groups should have a molecular weight of 2,000 to 1,000,000, preferably 5,000 to 1,000,000, most preferably 10,000 to 500,000. The number of amino groups in the molecule and/or at the terminals of the molecule should be 1 to 100 on average, preferably 1 to 10. When reacting the polar polymer with a modified polyethylene or polypropylene, the polar polymer preferably should have a molecular weight of 20,000 to 100,000.

If a polyolefin copolymer superior in adhesion is to be obtained, the polyolefin copolymer to be obtained by reacting the polymer having an effective number of amino groups. Preferred one should have a molecular weight of 2,000 to 1,000,000, preferably 5,000 to 500,000, most preferably 10,000 to 250,000.

When the polar polymer having amino groups has a molecular weight less than 2000, the polar polymer connected to the resulting polyolefin copolymer is low in molecular weight, and therefore, the resulting polyolefin copolymer is poor in performance as a compatibility improving agent for a polyolefin and polar polymer. On the other hand, when the molecular weight is in excess of 1,000,000, the resulting polyolefin copolymer is poor in moldability. Moreover, if the average number of amino groups in the molecule is less than 1, the rate of reaction is low and more unreacted products are formed; and if it is in excess of 100, the polymeric reaction proceeds excessively, causing crosslinking and gelation.

Since it is difficult to prepare a copolymer of an olefin and polar monomer by the block copolymerization of polyolefin, the polyolefin copolymer of this invention is produced by reacting the above-mentioned modified polyolefin with a polar polymer having amino groups, through the reaction that takes place between the amino group and the acid or anhydride thereof grafted on to the modified polyolefin. In this way a polar polymer can be easily grafted on to or block polymerized with a polyolefin.

The modified polyolefin can be reacted with the polymer having amino groups in any way used for grafting reaction. For example, the reaction may be accomplished by melting and mixing the polymers in a powerful mixing apparatus, or by subjecting the polymers to polymeric reaction in a solution.

The melt-mixing reaction may be performed as follows: Previously mixed two components are fed to a single-screw or multi-screw extruder continuously and melted and mixed at 150° to 250° C., and pelletized. Or, the two components are fed to a Banbury mixer for mixing at 150° to 250° C. for 5 minutes to 1 hour, followed by cooling and crushing.

The reaction in solution may be performed as follows: The two components are dissolved in an organic solvent such as aromatic hydrocarbons (e.g., benzene, toluene, xylene, ethylbenzene, diethylbenzene, and cumene) and hydrogenated aromatic hydrocarbons (e.g., tetralin and decalin). Then, reaction is carried out at 90° to 200° C. for 0.1 to 50 hours.

The quantity of the amino group-containing polymer to be reacted with the modified polyolefin is properly established according to the molecular weight of the intended polyolefin copolymer, the molecular weight of the polar polymer to be reacted, and the number of amino groups. Usually, the amino group-containing polymer is used in an amount of 20 to 200 parts by weight for 100 parts by weight of the modified polyolefin.

The polyolefin copolymer obtained according to the process of this invention is superior in adhesion to metals and a variety of resins such as vinyl chloride resin, acrylic resin, polyester resin, styrene resin, and ABS resin. In addition, it is highly compatible with a variety of resins such as mentioned above, because the part grafted on to the polyolefin is a polymer. Therefore, it is effective as a compatibility improving agent to be used when a polyolefin is mixed with a resin such as mentioned above. Moreover, the polyolefin copolymer of this invention is transparent unlike conventional blended composition.

The invention is now described in detail with reference to the following examples, in which quantities are expressed as percent by weight or parts by weight unless otherwise stated. The test methods used in the examples are described below.

Test Methods:

(1) Melt flow index (MI): According to ASTM D-1238

(2) Molecular weight (Weight Average): According to gel permeation chromatography (GPC)

(3) Tensile strength: According to ASTM D-638

(4) Flexural strength: According to ASTM D-790

(5) Izod impact strength: According to ASTM D-256; test piece 3.2 mm thick, with notch (6) Average diameter of dispersed particles: A lump of the composition prepared by mixing polyolefin, polyolefin copolymer, and polystyrene in a Brabender at 200° C. is cut at a low temperature and the cut surface is treated with chloroform and metallized with gold. By examination under a scanning electron microscope, the diameter of dispersed particles is measured.

(7) Delamination on bending: The same composition as used for measurement of average diameter of dispersed particles is formed into a 70×150×3 mm sheet using a hot press at 200° C. This sheet is wound around a brass rod, 7 mm in diameter, to see if whitening takes place. Whitening is regarded as an indication of delamination.

(8) Peel strength of coating film: Parallel scratches spaced at 1 mm are made at right angles with each other on a test piece measuring 10 mm by 10 mm. Pressure-sensitive cellophane tape is pressed down over the crosscut area and jerked away, and the number of remaining squares is counted.

(9) Warm water resistance: Test piece is dipped in warm water at 40° C. for 10 days, and the film peel test is conducted.

(10) Adhesion peel strength: A three-layer laminate composed of substrate A/adhesive/substrate B is formed using a hot press, with the polyolefin copolymer as the adhesive. The resulting laminate is cut to 2.5 cm wide test pieces. Using an Instron universal tensile tester, the test piece is peeled off at an angle of 180° and a rate of pulling of 10 cm/min. The peel strength is expressed by the tensile strength for 1 cm. In the case where the substrate A is a steel plate, two parallel cuts, 1 cm apart, are made through the resin layer and the resin layer is peeled at 90° and at a rate of pulling of 1 cm/min.

(11) Interface peel strength: Using a razor blade, 0.5 mm deep crosscuts are made on a flat test piece measuirng 70×130×3 mm, and the change of resin in the neighborhood of the crosscuts is observed.

EXAMPLES 1 to 10

Modified polyolefins and amino group-containing acrylic copolymers and polystyrene were prepared and they were made into polyolefin copolymers as follows. The resulting polyolefin copolymers were evaluated with respect to physical properties, adhesion properties, paintability. The results are shown in Tables 1 to 4.

Preparation of modified polyolefin:

A polyolefin such as linear low-density polyethylene (LLDPE hereinafter; density=0.926), propylene-ethylene random copolymer (PP hereinafter; ethylene content=4.6%), and ethylene-propylene rubber (EPR hereinafter; density=0.880); an unsaturated carboxylic acid or anhydride thereof such as maleic anhydride (MA acid hereinafter) and endo-bicylco-[2,2,1]-5-heptene-2,3-dicarboxylic anhydride (HA acid hereinafter); and a reaction initiator were mixed previously. The mixture was then extruded through a 65-mm φ vented single-screw extruder (L/D=28) set at 225° C., to effect modification reaction at a resin temperature of 230° C. The modified polyolefin was extracted with a solvent to remove unreacted acid anhydride.

Table 1 shows the molecular weight of each modified polyolefin and the number of grafted acid anhydride molecules per molecule of each modified polyolefin.

Preparation of amino group-containing polystyrene and ACRYLIC COPOLYMER (1) Polystyrene containing amino groups at terminals In a 2-liter autoclave which the atompshere replaced with nitrogen were placed styrene, azobisisobutyronitrile, and di-p-aminophenyldisulfide as much as necessary. The atompshere was replaced with nitrogen gas again, and the autoclave was tightly closed and dipped in a constant temperature bath at 80° C. Polymerization of styrene was carried out for 2.5 hours with stirring. The reaction product was dropped into methanol so as to separate the amino group-containing polystyrene, followed by separation and drying. Table 1 shows the molecular weight and the average number of amino groups per molecule of the resulting polystyrene containing amino groups at terminals.

(2) Acrylic copolymer containing amino groups at terminals

In a 2-liter autoclave with the atomsphere replaced with nitrogen were placed methyl methacrylate, ethyl acrylate, azobisobutyronitrile, and di-p-aminophenyldisulfide as much as necessary. The atmosphere was replaced with nitrogen gas again, and the autoclave was tightly closed and dipped in a constant temperature bath at 75° C. Polymerization of methyl methacrylate and ethyl acrylate was carried out for 2.5 hours with stirring. The reaction product was dropped into petroleum ether so as to separate the methyl methacrylate-ethyl acrylate copolymer containing amino groups at terminals, followed by separation and drying. Table 1 shows the molecular weight and the average number of amino groups per molecule of the resulting copolymer containing amino groups at terminals.

Synthesis of polyolefin copolymer (1) In a 500-ml three-neck flask equipped with a stirrer and reflux condenser were placed 200 ml of toluene or xylene, amino group-containing polystyrene or acrylic copolymer, and the modified polyolefin in the ratio shown in Table 1, and the reaction was carried out under the conditions shown in Table 1. After completion of reaction, the reaction liquid cooled to 40° C. was dropped into acetone with stirring to separate polyolefin copolymer. Unreacted substances were removed by filtration and washing. Table 1 shows the degree of conversion and the molecular weight of the resulting polyolefin copolymers (Examples 1 to 5)

(2) In a 1.7-liter Banbury mixer were mixed amino group-containing polystyrene or acrylic copolymer and modified polyolefin in the ratio shown in Table 1. Mixing and reaction were performed under the conditions shown in Table 1. After cooling, the reaction product was crushed into particles of about 3 mm in diameter and dissolved in xylene. The xylene solution was dropped into acetone to separate out the polyolefin copolymer and to separate unreacted substances. Table 1 shows the degree of conversion and the molecular weight of the resulting polyolefin copolymer (Examples 6, 7, 9, and 10)

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Modified polyolefin | MA modified LLDPE | MA modified PP | MA modified EPR | MA modified LLDPE | MA modified PP | MA modified PP | MA modified LLDPE | MA modified LLDPE | MA modified PP | MA modified PP |
| Average number of grafted acid (per molecule) | 2 | 2.5 | 2 | 4 | 1 | 2.5 | 4 | 2 | 2.5 | 2.5 |
| Molecular weight | 46000 | 110000 | 95000 | 50000 | 100000 | 110000 | 50000 | 46000 | 110000 | 110000 |
| Quantity charged (parts) | 50 | 50 | 60 | 50 | 70 | 60 | 50 | 60 | 90 | 90 |
| Polymer containing amino groups at terminals | Polystyrene | Acrylic copolymer | Polystyrene | Polystyrene | Polystyrene | Polystyrene | Acrylic copolymer | Acrylic copolymer | Polystyrene | Acrylic copolymer |
| Average number of amino groups (per molecule) | 2 | 2 | 2 | 2 | 2 | 2 | 2 | 2 | 2 | 2 |
| Molecular weight | 50000 | 35000 | 50000 | 50000 | 50000 | 50000 | 35000 | 35000 | 2000 | 2000 |
| Quantity charged (parts) | 50 | 50 | 40 | 50 | 30 | 40 | 50 | 40 | 10 | 10 |
| Method for reaction | Solution | Solution | Solution | Solution | Solution | Banbury mixer | Banbury mixer | Single screw extruder | Banbury mixer | Banbury mixer |

TABLE 1-continued

|  | Example 1 | Example 2 | Example 3 | Example 4 | Example 5 | Example 6 | Example 7 | Example 8 | Example 9 | Example 10 |
| --- | --- | --- | --- | --- | --- | --- | --- | --- | --- | --- |
| Solvent | Toluene | Xylene | Toluene | Toluene | Xylene | — | — | — | — | — |
| Reaction temperature (°C.) | Reflux | Reflux | Reflux | Reflux | Reflux | 200 | 200 | 220 | 200 | 200 |
| Reaction time (minutes) | 240 | 240 | 240 | 240 | 240 | 10 | 10 | — | 10 | 10 |
| Degree of conversion (%) | 90 | 70 | 85 | 95 | 80 | 80 | 90 | 85 | 18 | 19 |
| Molecular weight | 85000 | 135000 | 130000 | 96000 | 120000 | 140000 | 80000 | 60000 | 115000 | 116000 |

(3) In a Henschel mixer were preliminarily mixed amino group-containing acrylic copolymer and modified polyolefin in the ratio shown in Table 1. The mixture was fed to a vented single-screw extruder (40 mm$\phi$ L/D=28) equipped with a Dulmage screw at a rate of 150 g/min. The extruder was run at 75 rpm and the cylinder temperature was kept at 220° C. to effect reaction. The extrudate was pelletized, and the unreacted substances were removed from the pellets in the same was as in (2) above. Thus, there was obtained a polyolefin copolymer. Table 1 shows the degree of conversion and the molecular weight of the resulting polyolefin copolymer. (Example 8)

Performance of polyolefin copolymer (1) Compatibility of composition

Resin compositions were prepared by mixing of the polyolefin copolymer prepared in Example 5 or 10, polystyrene (available under a trade name of Topolex 500 from Mitsui Toatsu Chemicals, Inc.), and polypropylene (MI=5.0); available under a trade name of Tonen Polypro J-205 available from Tonen Petrochemical Co., Ltd.) in the ratio shwn in Table 2, using a Brabender at 200° C. These compositions were formed into 3-mm thick sheets using a molding press. Test pieces were prepared from these sheets for measuring physical properties, diameter of dispersed particles, and delamination on bending. The results are shown in Table 2 (Experiment Nos. 1 and 2). The same test was carried out, except that the polyolefin copolymer was replaced by the MA-modified PP used in Example 2. The results are shown in Table 2 (Experiment No. 3)

It is to be noted from this table that the polypropylene composition containing the copolymer of this invention is superior in dispersion of polyproylene and is improved in mechanical properties. In addition, it is improved in miscibility to such an extent that delamination does not take place in the molded items.

(2) Paintability of composition

TABLE 2

| Experiment No. | 1 | 2 | 3 |
| --- | --- | --- | --- |
| Polyolefin Copolymer (parts) | 6 | 10 | 10* |
| Polypropylene (parts) | 77 | 71 | 71 |
| Polystyrene (parts) | 17 | 19 | 19 |
| MI (g/10 min) | 4.9 | 5.4 | 5.2 |
| Tensile strength (kg/cm$^2$) | 400 | 350 | 330 |
| Flexural strength (kg/cm$^2$) | 580 | 490 | 470 |
| Izod impact strength (kg-cm/cm$^2$) | 4.0 | 2.0 | 1.7 |
| Average diameter of dispersed polystyrene particles ($\mu$) | 0.8 | 0.7 | 10.0 |
| Delamination on bending | No delamination | Slight delamination | Delamination |

*Ma-modified PP

Resin compositions were prepared by mixing the polypropylene obtained in Example 2 or 9, acrylic copolymer (available under a trade name of Paraloid B-66 from Rohm & Haas Co.), and polypropylene (same as mentioned in (1) above) in the ratio shown in Table 3, using a Barbender at 200° C. These compositions were formed into 2-mm thick sheets using a molding press. The paintability of these sheets was evaluated by applying an acrylic paint. Test pieces for measuring physical properties were prepared in the same was as in (1) above. The results are shown in Table 3 (Experiment Nos. 4 and 5). The same test was carried out, except that the polyolefin copolymer was replaced by the MA-modified PP used in Example 2. The results are also shown in Table 3 (Experiment No. 6).

It is to be noted from this table that the polypropylene composition containing the copolymer of this invention is improved in mechanical properties and paintability.

(3) Adhesion properties

Each polyolefin copolymer obtained in Example indicated in Table 4 was dissolved in toluene, and the solution was applied to various kinds of substrate A as shown in Table 4. After evaporation of the solvent, a 5-micron thick adhesive layer was formed. On to this adhesive layer was laminated a sheet of substrate B as shown in Table 4 using a press. Thus, there were obtained various kinds of three-layered laminates. The peel strength of these laminates was measured, and the results are shown in Table 4 (Experiment Nos. 7 to 13).

For the purpose of comparison, the same laminate as above was prepared using as the adhesive layer the MA-modified LLDPE used in Example 1, and it was subjected to the same test as above. The results are also shown in Table 4 (Experiment No. 14).

It is to be noted from Table 4 that the laminates formed with the coplymer of this invention as an adhesive is superior in adhesion properties.

TABLE 3

| Experiment No. | 4 | 5 | 6 |
| --- | --- | --- | --- |
| Polyolefin copolymer | Copolymer in Example 2 | Copolymer in Example 9 | MA-modified PP |
| Polyolefin copolymer (parts) | 5 | 10 | 10 |
| Polypropylene (parts) | 86 | 81 | 81 |
| Acrylic copolymer (parts) | 9 | 9 | 9 |
| Tensile strength (kg/cm$^2$) | 370 | 350 | 330 |
| Izod impact strength (kg-cm/cm$^2$) | 3.5 | 2.0 | 1.8 |
| Film peel strength | 100/100 | 100/100 | 100/100 |
| Appearance after warm water resistance test | No change | No change | Blisters |
| Film peeling after warm water resistance test | 100/100 | 80/100 | 40/100 |
| Interface peel strength | No change | Very little peeling | Partial peeling |

TABLE 4

| | Experiment No. | | | | | | | |
|---|---|---|---|---|---|---|---|---|
| | 7 | 8 | 9 | 10 | 11 | 12 | 13 | 14 |
| Substrate A | | | | | | | | |
| Kind | Plasticized PVC | Bonderrized steel plate | Plasticized PVC | Polystyrene | Polystyrene | Polystyrene | Plasticized PVC | Plasticized PVC |
| Thickness (mm) | 1 | 2 | 1 | 2 | 2 | 2 | 1 | 1 |
| Adhesive | | | | | | | | |
| Kind | Copolymer in Example 6 | Copolymer in Example 6 | Copolymer in Example 2 | Copolymer in Example 1 | Copolymer in Example 5 | Copolymer in Example 9 | Copolymer in Example 10 | MA-modified LLDPE |
| Thickness ($\mu$) | 5 | 5 | 5 | 5 | 5 | 5 | 5 | 5 |
| Substrate B | | | | | | | | |
| Kind | HDPE | HDPE | PP | HDPE | PP | PP | PP | HDPE |
| Thickness (mm) | 1 | 1 | 1 | 1 | 1 | 1 | 1 | 1 |
| Bonding conditions | | | | | | | | |
| Temperature (°C.) | 150 | 160 | 170 | 150 | 170 | 170 | 170 | 150 |
| Time (minutes) | 2 | 2 | 2 | 2 | 2 | 2 | 2 | 2 |
| Pressure (kg/cm$^2$G) | 10 | 10 | 10 | 10 | 10 | 10 | 10 | 10 |
| Performance | | | | | | | | |
| Peel strength (kg/25 mm) | 17.0 | 11.0 | 17.0 | >7.0 | >7.0 | 3.0 | 3.5 | No adhesion |
| Type of peeling | Cohesive failure | Interfacial failure | Cohesive failure | Failure in polystyrene | Failure in polystyrene | Interfacial failure | Interfacial failure | — |

What is claimed is:

1. A composite comprising
   (a) a substrate of a metal or a resin selected from one or more of vinyl chloride resin, acrylic resin, polyester resin, styrene resin, and ABS resin; and
   (b) a modified polyolefin of ethylene or propylene adhered to said substrate wherein the polyolefin has grafted thereto an unsaturated carboxylic acid or anhydride thereof and the grafted polyolefin is reacted with a polar polymer or copolymer which is the reaction product of a vinyl compound and amino containing compound, said reaction product having reactive amino groups and a weight average molecular weight of between about 20,000 and 1,000,000.

2. The composite of claim 1 wherein the grafted polyolefin has a weight average molecular weight of from 5,000 to 1,000,000 and from 1 to 50 unsaturated carboxylic acid groups or anhydride thereof in the molecule; and said polar polymer or copolymer has from 1 to 100 amino groups in the molecule.

3. The composite of claim 1 wherein the grafted polyolefin has a weight average molecular weight of from 10,000 to 500,000 and from 1 to 10 unsaturated carboxylic acid groups or anhydride thereof in the molecule.

4. The composite of claim 3 wherein said grafted polyolefin is a polymer or copolymer of ethylene having a weight average molecular weight of 10,000 to 100,000.

5. The composite of claim 2 wherein the polar polymer is obtained by copolymerizing a monomer having a vinyl group with a monomer having an amino group.

6. The composite of claim 5 wherein the monomer containing a vinyl group is selected from acrylic monomers and styrene monomers.

7. A composite of claim 1 wherein 100 parts by weight of the grafted polymer is reacted with between 20 to 200 parts by weight of the polar polymer or copolymer.

8. A composite of claim 2 wherein the substrate and the modified polymer are in sheet form forming a laminate.

9. A composite of claim 1 wherein the polar polymer is an amino terminated polystyrene or an amino terminated acrylic copolymer.

10. A composite of claim 1 wherein the polar polymer has a weight average molecular weight between 20,000 and 100,000.

11. A process for the production of a composite having improved adhesion which comprises
    (a) grafting onto a polyolefin of ethylene or propylene from 1 to 10 an unsaturated carboxylic acid or anhyydride thereof forming a modified polyolefin having a weight average molecular weight between 10,000 and 500,000;
    (b) reacting a vinyl compound with a amino containing compound to form a polymer or copolymer having reactive amino groups and having a weight average molecular weight between 20,000 and 1,000,000;
    (c) reacting said grafted polyolefin with polymer prepared in step (b); and
    (d) adhering the reaction product of step (c) with a metal or one or more of vinyl chloride resin, acrylic resin, polyester resin, styrene resin, and ABS resin.

12. The process of claim 11 wherein the modified polyolefin has a weight average molecular weight of from 5,000 to 1,000,000 and from 1 to 50 unsaturated carboxylic acid groups of anhydride thereof in the molecule or terminals thereof.

13. A laminate comprising
    (a) a first layer of a metal or a resin selected from one or more of vinyl chloride resin, acrylic resin, styrene resin;
    (b) a second layer of a polyolefin resin selected from ethylene or propylene polymers and copolymers; and
    (c) an adhesive layer adhesively joining said first and second layers and comprising a modified polyolefin of ethylene or propylene having grafted thereon from 1 to 10 unsaturated carboxylic acid or anhydride thereof in the molecule including terminals thereof and having a weight average molecular weight of 10,000 to 500,000, the grafted polyolefin being reacted with a polar polymer or copolymer in a weight ratio of 20 to 200 parts by weight of the polar polymer or copolymer per 100 parts by weight of the grafted polyolefin, said polar polymer or copolymer being the vinyl polymerization product of a vinyl compound and an amino containing compound and having from 1 to 10 reactive amino groups in the molecule or terminals thereof and weight average molecular weight of between 20,000 and 1,000,000.

14. The laminate as defined in claim 13 wherein the polar polymer is amino terminated polystyrene or amino terminated acrylic copolymer having a weight average molecular weight between 20,000 and 100,000.

15. A laminate as defined in claim 13 wherein the first layer is a metal.

16. A laminate as defined in claim 15 wherein the metal is steel and the modified polyolefin is linear low density polyethylene.

17. A laminate as defined in claim 16 wherein the second layer is a polyethylene film.

18. A composite as defined in claim 1 wherein the substrate is a metal.

19. A laminate as defined in claim 15 wherein the polar polymer or copolymer is selected from the group consisting of amino terminated polystyrene or amino terminated acrylic copolymers.

20. A laminate as defined in claim 13 wherein the first layer is a resin selected from vinyl chloride, acrylic resin, and styrene resin.

21. A laminate as defined in claim 20 wherein the polar polymer or copolymer is selected from the group consisting of amino terminated polystyrene and amino terminated acrylic copolymers.

22. A laminate as defined in claim 1 wherein the substrate is a resin selected from vinyl chloride, acrylic resin, and styrene resin.

* * * * *